March 24, 1970 W. C. ALBERT 3,502,342
FACE TYPE LIQUID METAL SEAL AND METHOD OF MAKING THE SAME
Filed Dec. 1, 1967 2 Sheets-Sheet 1
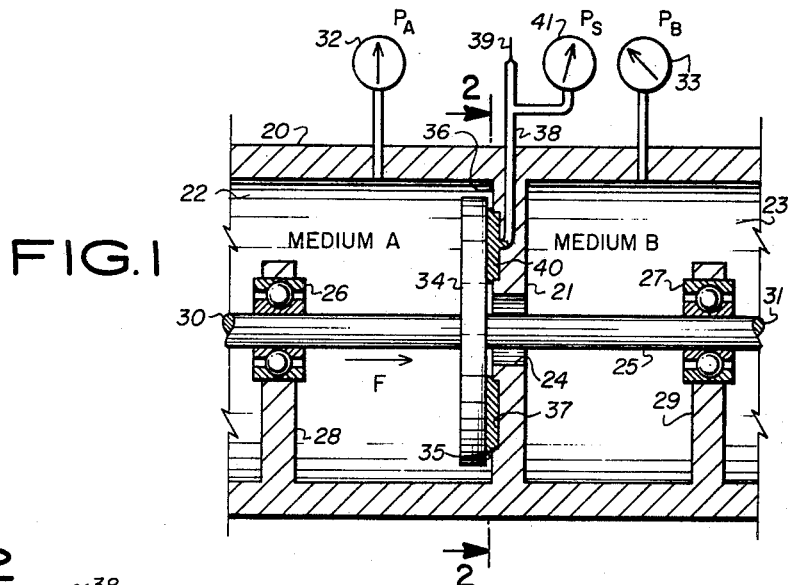
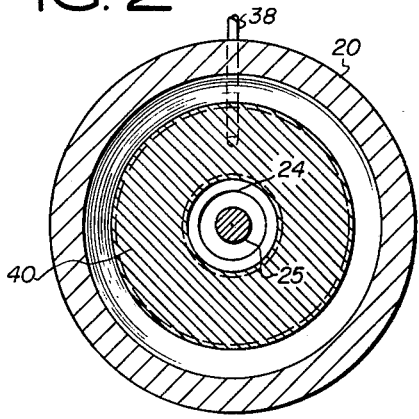
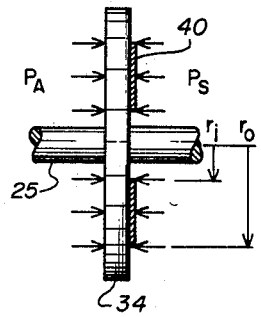
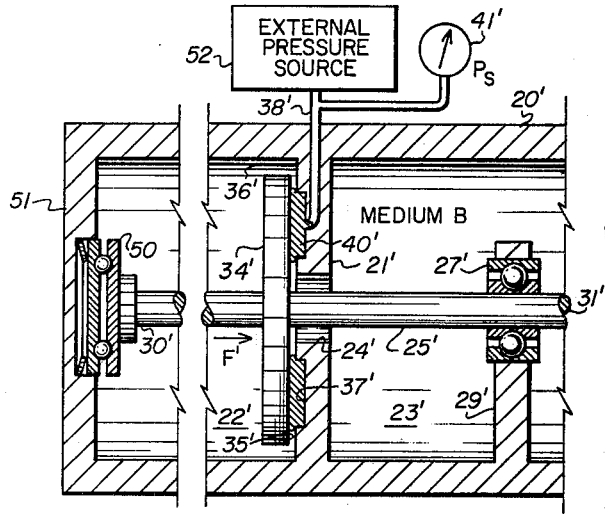
INVENTOR.
WILLIAM C. ALBERT
BY Karl A. Ohralik
ATTORNEYS March 24, 1970 W. C. ALBERT 3,502,342
FACE TYPE LIQUID METAL SEAL AND METHOD OF MAKING THE SAME
Filed Dec. 1, 1967 2 Sheets-Sheet 2
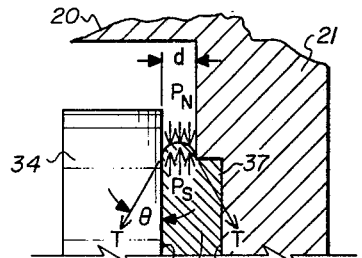
FIG. 5
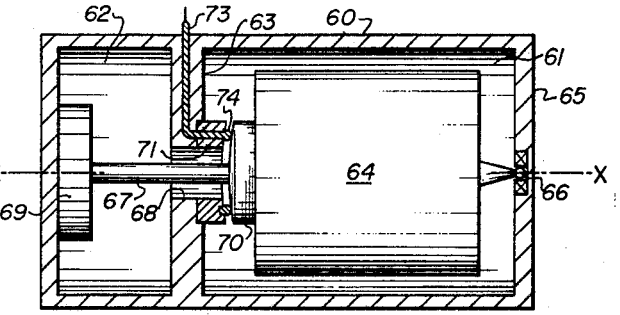
FIG. 6
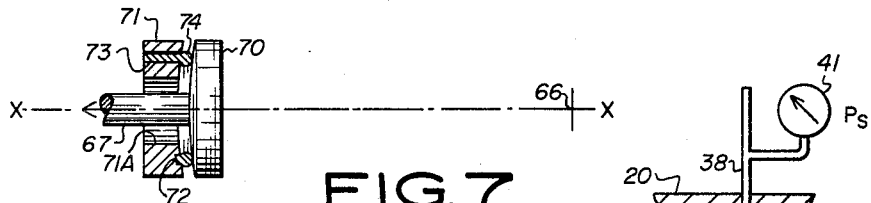
FIG. 7
FIG. 9
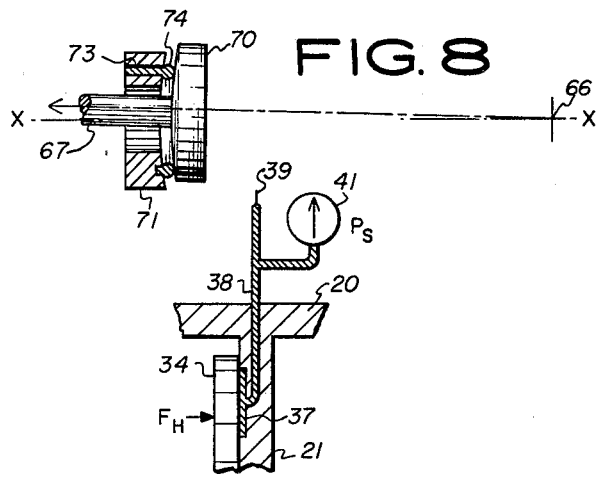
FIG. 8
FIG. 10
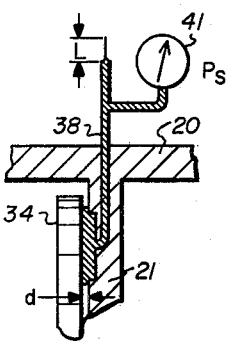
FIG. 11
INVENTOR.
WILLIAM C. ALBERT
BY Karl A. Ohralik
ATTORNEYS

United States Patent Office 3,502,342
Patented Mar. 24, 1970

3,502,342
FACE TYPE LIQUID METAL SEAL AND METHOD OF MAKING THE SAME
William C. Albert, Waldwick, N.J., assignor to Singer-General Precision, Inc., a corporation of Delaware
Filed Dec. 1, 1967, Ser. No. 687,286
Int. Cl. F16j *15/40*
U.S. Cl. 277—17                                      13 Claims

ABSTRACT OF THE DISCLOSURE

A face type liquid metal seal is provided for applications of the type wherein the rotary motion of a shaft is to be transmitted through an aperture in a wall separating two fluid mediums. The surface of the wall surrounding the aperture constitutes one face of the seal and is provided with an annular groove surrounding the aperture and substantially concentric with the axis of rotation of the shaft. The annular groove is connected to a fill tube which is disposed in the wall and which provides a means of filling the groove with a liquid metal to create the seal. A collar is disposed on the shaft for rotation therewith adjacent the first seal face and functions to provide a second seal face which is equidistantly spaced from the first seal face. When the motion to be transmitted by the shaft is a simple rotary motion, the seal faces may be parallel surfaces. If the motion to be transmitted is both rotary and pivotal, as is, for example, the motion of the rotor float output shaft in certain types of gyroscopes and other spatial orientation responsive devices wherein the shaft is disposed at one end thereof in a universal pivot arrangement, the seal faces are made spherical in shape with the center of curvature of both faces coincident with the pivot point of the shaft to preserve the equidistant spacing of the faces upon pivotal movement of the shaft.

When the fill tube and annular groove are filled with a liquid metal, such as mercury, a mercury alloy, gallium, or a gallium alloy, for example, a ring of the liquid metal is formed around the aperture between the faces of the seal and functions to provide a fluid-tight seal separating the two fluid mediums. Since the liquid metal of the ring will readily shear upon rotation of the shaft, the only frictional resistance presented by the seal will be that arising from the viscosity of the liquid metal and the seal will be virtually frictionless in operation. In order to create a satisfactory seal, the liquid metal must be nonreacting and non-wetting with respect to the two fluid mediums and the materials of which the seal faces are made. Additionally, the internal pressure of the liquid metal ring must be greater than the pressure of each of the two fluid mediums involved. A method of making the seal is also disclosed and comprises the steps of holding the seal faces together while evacuating the annular groove and fill tube, filling the evacuated groove and fill tube with the liquid metal, crimping the end of the tube closed, and flattening a predetermined length of the fill tube to force the seal faces apart and create the required seal gap.

BACKGROUND OF THE INVENTION

Field of the invention

This invention relates generally to face type, motion-transmitting seals and more particularly to a face type liquid metal seal having a virtually frictionless motion-transmitting characteristic. The invention also contemplates a novel method of making the seal.

Description of the prior art

Motion-transmitting seals of the face type are generally employed in applications wherein a particular mechanical motion, usually the rotary motion of a shaft, must be transmitted from one fluid medium to another fluid medium through an aperture in a wall separating the two mediums. The "faces" of the seal are formed by the surface of the wall surrounding the aperture and by the rotating surface of a collar or disk mounted on the shaft for rotation therewith. The two mediums separated by the seal are usually fluids, such as liquids or gases, but in some applications may also comprise a vacuum. Accordingly, the term "fluid medium" as used herein shall be deemed to include a vacuum.

A major difficulty encountered with prior art motion-transmitting seals is that in order to create a satisfactory seal which will withstand a relatively high pressure differential between the two mediums being separated by the seal, a large axial force must be applied to the surfaces or faces separated by the seal, with the result that a large frictional loss is encountered which attenuates the motion being transmitted through the seal. For example, the well known O ring seal, which usually comprises a ring of rubber or other resilient material, presents a high frictional resistance to motion transmitted through the seal because the O ring must be compressed between the faces of the seal with a relatively large force in order to provide a fluid-tight sealing action. This type of seal may also be subject to leakage when the material of the O ring ages and deteriorates and may also present an "outgassing" problem when the seal is employed to separate a vacuum from another fluid medium. Motion-transmitting seals, such as metal bellows and metal diaphragms, present problems of limited operating life because of metal fatigue and also possess limited torque transmission capability. Additionally, metal bellows and diaphragms are subject to "shelf" leakage arising from the porosity of the metal and usually require coatings of lacquer or other suitable material to provide the required fluid-tight operation over extended periods of time. A further problem encountered with sealing devices of the bellows and diaphragm type is that the manufacture of this type requires so-called "high skill" operations, such as brazing, for example, which greatly add to the manufacturing and maintenance costs of the device. Electromagnetic and electrostatic sealing devices utilizing metallic powders and metal particles dispersed in oil and other substances have also been utilized for some applications but generally suffer from the disadvantages of low torque transmission, low pressure handling capability, and the necessity of maintaining an electric power supply for the seal.

An important application of face type, motion-transmitting seals is found in gyroscopes and other spatial orientation responsive devices which are used in aircraft and guided missle control systems. In some gyroscopes of this type, the gyro rotor is enclosed in a float which is pivotally disposed at one end thereof in a liquid medium to "cushion" the rotor float assembly from transient accelerations and other forces. The rotor float assembly is connected by an outpt shaft to pickoff means and the motion transmitted by the shaft is both rotational and pivotal. The pickoff element for the gyroscope is usually disposed in a vacuum for suitable accuracy of operation, thereby requiring the use of a motion-transmitting seal which is capable of withstanding the high pressure differential between the rotor medium and the pickoff medium and which is capable of providing both rotary and pivotal motion transmission with a very low frictional loss. Additionally, in aircraft and guided missle applications, the motion transmitting seal employed in the gyroscope or other spatial orientation responsive device must be capable of withstanding wide variations in ambient temperature and must of necessity be mechanically rugged.

SUMMARY OF THE INVENTION

It is an object of this invention to provide a face type liquid metal seal which is capable of transmitting mechanical motion with an extremely low frictional loss and which satisfactorily provides a fluid-tight seal between fluid mediums of widely different pressures.

It is a further object of this invention to provide a face type liquid metal seal which is especially adapted for use in gyroscopes and other spatial orientation responsive devices of the type wherein two fluid mediums are separateed by a wall having an aperture therein through which the rotary and pivotal movements of a shaft are to be transmitted.

It is a still further object of this invention to provide a face type liquid metal seal of relatively simple construction which is correspondingly easy to manufacture and maintain and which is adapted for use in aircraft and guided missile applications.

It is another object of this invention to provide a method of making the aforementioned face type liquid metal seal which can be performed by relatively unskilled labor and which is readily adapted for automated processes.

Briefly, the present invention contemplates the provision of a face type liquid metal seal for apparatus of the type wherein the rotation of a shaft is to be transmitted through an aperture in a wall separating two fluid mediums. The shaft is provided with a face member which is rotatable with the shaft in relation to the wall and which forms a pair of equidistantly spaced seal faces with the surface of the wall surrounding the aperture. The face type liquid metal seal of the invention for apparatus of this type comprises an annular groove which is formed in the seal face surrounding the aperture and which is concentrically disposed with respect to the axis of rotation of the shaft. A ring of liquid metal is provided to fill the annular groove and to separate the seal faces, thereby permitting rotational movement of the shaft. In order to establish a satisfactory seal, the liquid metal employed must be non-reacting and non-wetting with respect to the fluid mediums separated by the seal and the materials of which the seal faces are made. Additionally, the internal pressure of the liquid metal seal must be greater than the pressure of each of the mediums separated by the seal. When the foregoing requirements are satisfied, the liquid metal ring will provide a fluid-tight seal separating the two fluid mediums and the only frictional resistance offered by the seal to the rotation of the shaft will be the frictional resistance arising from the viscosity of the liquid metal. Since this resistance is negligible for most applications, the seal operates in a virtually frictionless manner.

In those situations where a pressure differential exists between the pressuures of the fluid mediums separated by the seal and the axial force exerted by the pressure differential is in a direction which tends to urge the seal faces together, the internal pressure of the liquid metal ring will be raised if the shaft is unrestrained. When the pressure differential is not great enough to create a pressure in the liquid metal which is greater than the pressure of each of the two mediums separated by the seal, mechanical biasing means may be employed to exert an axial force on the seal faces to create the necessary liquid metal seal pressure. The internal pressure of the liquid metal seal may also be raised to the required value by restraining the shaft against axial movement and utilizing an external fluid pressure supply source for pressurizing the annular groove. A fill tube disposed in the wall in communication with the annular groove for making the liquid metal ring may conveniently be employed to connect the annular groove to the external fluid pressure supply source. When the face type liquid metal seal of the invention is utilized in applications wherein the shaft is pivotally mounted, so that the shaft transmits both rotational and pivotal movement through the aperture separating the fluid mediums, the equidistantly spaced seal faces are made spherical with the center of curvature of each of the faces coincident with the pivot point of the shaft.

The present invention also includes a novel method of making the aforementioned face type liquid metal seal which permits the seal to be manufactured by relatively unskilled labor or by automated processes. The method of the invention comprises the steps of holding the seal faces together and evacuating the annular groove and fill tube to remove all air and other matter, filling the evacuated annular groove and fill tube with the liquid metal, crimping the fill tube closed, and flattening a predetermined length of the fill tube to force the seal faces apart and establish the required seal gap.

The nature of the invention and other objects and additional advantages thereof will be more readily understood by those skilled in the art after consideration of the following detailed description taken in conjunction with the accompanying drawings.

BRIEF DESCRIPTION OF THE DRAWINGS

In the drawings:

FIG. 1 is a full sectional view, foreshortened for convenience of illustration, of a cylindrical housing of the type employed in certain gyroscopes, for example, illustrating the face type liquid metal seal of the invention;

FIG. 2 is a full sectional view of the gyroscope housing taken along the line 2—2 of FIG. 1 of the drawings;

FIG. 3 is a fragmentary view of the liquid metal seal shown in FIGS. 1 and 2 of the drawings, illustrating the fluid pressures exerted upon the rotatable face member of the seal;

FIG. 4 is a full sectional view, aforeshortened for convenience of illustration, of a housing and associated liquid metal seal arrangement, employing additional means for increasing the internal pressure of the seal;

FIG. 5 is an enlarged fragmentary view of the liquid metal seal of FIGS. 1 and 2 of the drawings showing the interface between the liquid metal of the seal and the fluid mediums separated by the seal;

FIG. 6 is a schematic diagram of a two-axis rate gyroscope of the rotor member flotation type employing the liquid metal seal of the invention;

FIG. 7 is an enlarged sectional view of the liquid metal seal structure of FIG. 6 of the drawings showing the rotor float shaft in a neutral position;

FIG. 8 is an enlarged secional view of the seal structure employed in FIG. 6 of the drawings showing the rotor float shaft in a tilted position; and FIGS. 9, 10 and 11 are fragmentary views of the face type liquid metal seal of the invention at various stages in the construction of the seal and are useful in explaining the method of constructing the seal.

DESCRIPTION OF THE PREFERRED EMBODIMENT OF THE INVENTION

Referring now to FIGS. 1 and 2 of the drawings, the face type liquid metal seal of the invention is illustrated as applied to a cylindrical housing 20 which may, for example, be the housing of a gyroscope or other spatial orientation responsive device. An inwardly extending wall 21 is provided on the housing 20 to divide the interior of the housing into a first portion 22 and a second portion 23. An aperture 24 is formed in the wall 21 of the housing to receive a shaft 25 which is concentrically disposed within the housing extending through both portions 22 and 23. The shaft 25 is axially unrestrained, but is rotatably supported in bearings 26 and 27 which are respectively supported by flanges 28 and 29 extending from the housing 20. The end 30 of shaft 25 which is located in the portion 22 of the housing may be connected to an input or drive mechanism (not shown), which is disposed in a first fluid medium designated as "medium A." The end 31 of the shaft 25 which is located in housing portion 23 may be connected to an output or driven mechanism (not shown) which is disposed in a second fluid medium designated as "medium B." For example, in gyroscopes of the rotor flotation type, the end 30 of shaft 25 may be connected to a gyro rotor member which is disposed in a first fluid medium such as a liquid, while the other end 31 of the shaft may be connected to the pickoff means of the gyroscope which is disposed in a second fluid medium, such as a vacuum. A situation such as this exists in many devices, wherein one member of the device must be operated in a first fluid medium while another member of the device must be operated in a second fluid medium, because of the operating requirements of the device. Accordingly, mediums A and B may be completely different fluid mediums at the same or different pressures or may comprise the samed medium but at different pressures.

For convenience of explanation, a pressure gage 32 is shown in communication with interior portion 22 of the housing to indicate the presure $P_A$ of medium A, while a pressure gage 33 is shown in communication with interior portion 23 of the housing to yield an indication of the pressure $P_B$ of medium B. When the respective pressures $P_A$ and $P_B$ of mediums A and B are not equal, it is apparent that a seal of some kind must be provided between portions 22 and 23 of the cylindrical housing 20 to preserve the separation of the mediums. Similarly, when mediums A and B are at the same pressure but consist of different fluids, it is apparent that some means must be provided to separate the two mediums, since different mediums at the same pressure may intermingle by diffusion. Accordingly, it is necessary to provide a motion-transmitting seal of some sort extending around aperture 24 in interior wall 21 of the housing. The seal so provided must be capable of imposing only a minimal frictional resistance to the rotary motion of shaft 25 which must be transmitted from portion 22 of the housing to portion 23 of the housing. The previously discussed prior art O ring seals have been generally employed for rotary motion transmission, but suffer from the disability of high frictional losses and are subject to deterioration with age. Since rotary motion is to be transmitted from medium A to medium B, prior art seals of the bellows and diaphragm types are relatively useless unless the angular movement of the shaft is extremely small and within the stress and fatigue limits of the material employed in the bellows or diaphragm. When medium A or medium B is a vacuum, the seal utilized must also be free from "outgassing," since any gaseous matter adsorbed or trapped in the material of the seal will be readily drawn into the evacuated area and will therefore contaminate or destroy the vacuum.

The face type liquid metal seal of the invention is shown in FIGS. 1 and 2 as comprising a collar or seal face member 34 which is fixedly mounted on shaft 25 for rotation therewith. The collar 34 has a diameter which is greater than the diameter of the aperture 24 in the inwardly extending wall 21 of the housing to thereby provide a pair of parallel or equidistantly spaced seal faces 35 and 36, which completely surround the aperture 24. An annular groove 37 is formed in the seal face 36 around aperture 24 and communicates with a fill tube 38, which projects exteriorly of the housing 20. The annular groove 37 and the fill tube 38 are filled with a liquid metal and the fill tube is pinched closed at the upper end 39 thereof. When the annular groove 37 is completely filled with the liquid metal, a ring 40 of the liquid metal is created around the aperture 24 between the parallel seal faces 35 and 36. A pressure gage 41 is illustrated to show the internal pressure $P_S$ of the liquid metal employed in the seal.

In order to provide a proper sealing action, it is necessary that the liquid metal employed in the seal possess certain characteristics, such as suitable non-reacting and non-wetting characteristics with respect to the two fluid mediums involved and the materials of which the seal faces are made. The surface phenomenon of a liquid, known as "wetting," refers to the situation wherein the adhesive force between the molecules of the liquid metal of the seal and the molecules of the material of the seal faces is greater than the cohesive force between the molecules of the liquid metal. When the adhesive force is greater than the cohesive force, the liquid metal filling the annular groove 37 of the housing wall 21 is not retained in the groove, but is easily dispersed along the faces of the seal. When the liquid metal is non-wetting with respect to the materials employed for the seal faces 35 and 36, the adhesive force existing between the molecules of the liquid metal and the molecules of the material of the seal faces is less than the cohesive force existing between the molecules of the liquid metal, with the result that the liquid metal ring 40 stays in position about the aperture 24 to provide an effective seal between mediums A and B. A further requirement imposed upon the liquid metal employed in the seal is that the metal does not react chemically with the mediums A and B or the materials of which the seal faces 35 and 36 are made. For example, when one of the fluid mediums is air, great care must be taken to select a liquid metal which is not subject to oxidation. Suitable liquid metals for use in a seal of this type have been found to be mercury, mercury alloys, gallium and gallium alloys, for example. Although it is theoretically possible to use other metals for the seal, the high melting points of the better-known metals precludes their use except for applications wherein the ambient temperature to which the seal is subjected is in excess of the melting point of the metal selected. Suitable materials for the seal faces which are in contact with the liquid metal have been found to be quartz, stainless steel and ceramics, for example. The selection of a particular liquid metal for the seal and particular materials for the seal faces will, of course, depend upon the fluid mediums being separated by the seal and upon other factors, such as ambient temperature range and mechanical operating conditions, for example.

In general, when the fill tube 38 and the annular groove 37 of the seal are filled with a liquid metal having the prescribed characteristics, the liquid metal forms a ring 40 similar in nature to a conventional O ring seal which completely surrounds the aperture 24 in the housing wall 21 and which tends to axially displace the seal face 35 of collar 34 from the face 36 of the wall 21. When the liquid metal of the seal is maintained at a suitable internal pressure, as will be fully explained hereinafter, the surface tension and non-wetting properties of the liquid metal cause the ring 40 to form a fluid-tight seal between the portions 22 and 23 of the housing, to thereby prevent diffusion of mediums A and B and to permit these mediums to be maintained at different operating pressures. Upon rotation of the shaft 25, the liquid metal ring 40 exerts a very small frictional resistance to the rotary motion of the shaft because the layers of liquid metal tend to shear in planes which are parallel to the seal faces 35 and 36. Accordingly, the only frictional force exerted by the seal will be that due to the viscosity of the liquid metal itself. In contrast to the prior art O ring type of seal, there is no friction existing between the surface of the liquid metal ring and the faces 35 and 36 of the seal, so that the seal operates in virtually a frictionless manner.

A retirement imposed upon the liquid metal seal of the invention is that the internal pressure $P_S$ of the liquid metal be greater than $P_A$ or $P_B$, the pressures of the fluid mediums separated by the seal. This may be accomplished in several ways. For example, in the construction shown in FIGS. 1 and 2 of the drawings, the shaft 25 is under no axial restraint and is free to move axially within the cylindrical housing 20 in either direction. Under these conditions, if the pressure $P_A$ of medium A is greater than the pressure $P_B$ of medium B, it is apparent that an axial force F resulting from the pressure differential will exist in the direction of the arrow shown in FIG. 1 of the drawings. This force will tend to urge the seal face 35 against the seal face 36 and will tend to raise the internal pressure of the liquid metal of the seal in the following manner. The force F resulting from the pressure differential is given by the expression (1) $$F = F_A - F_B$$

where $F_A$ is the force exterted by $P_A$ on the collar 34 and $F_B$ is the force exerted by $P_B$ on the collar. For the collar 34 and the shaft 25 to remain at rest with no axial movement, the liquid metal ring 40 must exert a force $F_S$ which is equal in magnitude and opposite in direction to the force F. Accordingly, (2) $$F_S = F_A - F_B$$

The maximum force exerted by the seal 40 will occur when medium B is a vacuum, since $F_B$ is then zero and (3) $$F_S = F_A$$

As seen in FIG. 3 of the drawings, the force $F_S$ exerted by the seal on collar 34 may be given by the expression (4) $$F_S = P_S \pi (r_o^2 - r_i^2)$$

where $r_o$ is the outer radius of the ring 40 and $r_i$ is the inner radius of the ring, while the force $F_A$ exerted on the collar 40 may be expressed as (5) $$F_A = P_A \pi r_o^2$$

it being assumed that $P_A$ also exerts a force against the unrestrained end 30 of shaft 25. When Equations 4 and 5 are substituted for Equation 3 and the resulting expression is solved for $P_S$, there results (6) $$P_S = P_A \left[ \frac{1}{1 - \left(\frac{r_i}{r_o}\right)^2} \right]$$

Accordingly, for an axially unrestrained shaft 25 as shown in FIGS. 1 and 2 of the drawings and for the condition when $P_A$ is greater than $P_B$, it follows that the internal pressure $P_S$ of the liquid metal seal 40 must be greater than the pressure $P_A$ of medium A and the pressure $P_B$ of medium B for satisfactory operation of the seal.

Since the shaft 25 is axially unrestrained in the arrangement shown in FIGS. 1 and 2 of the drawings, the only axial force which must be counteracted by the liquid metal seal 40 is that which is due to the pressure differential existing between mediums A and B. When the shaft 25 is subjected to an additional axial force in the same direction as the force exerted by the pressure differential, it follows that the liquid metal seal must counteract not only the force due to the pressure differential but also the additional force which is applied. For example, in FIG. 4 of the drawings, a thrust bearing 50 is shown as being mounted on an end wall 51 of the housing 20' to supplement the force exerted by the pressure differential on the collar 34'. In FIG. 4, reference characters with a prime notation are employed to designate those parts of the housing and seal which are the same as or similar to the corresponding parts of the arrangement shown in FIGS. 1 and 2 of the drawings. The total force F' exerted on the shaft 25' and collar 34' is then given by the expression (7) $$F' = (F_A - F_B) + F_C$$

where $(F_A - F_B)$ is the force produced by the pressure differential between the two mediums separated by the seal and $F_C$ is the force exerted by the thrust bearing 50.

If medium B is a vacuum, then the force $F_S$ exerted by the seal is (8) $$F_S = F_A + F_C$$

and the expression for $P_S$, the internal pressure of the liquid metal seal, becomes (9) $$P_S = P_A \left[ \frac{1}{1 - \left(\frac{r_i}{r_o}\right)^2} \right] + \frac{F_C}{r_o^2 - r_i^2}$$

from which it is seen that the internal pressure of the seal must be increased by an amount equal to

(10) $$\frac{F_C}{r_o^2 - r_i^2}$$

to counteract the force $F_C$ exerted by the thrust bearing.

From the foregoing analysis it is believed apparent that the pressure within the liquid metal seal must be sufficiently great to produce a force which will counteract not only the force produced by the pressure of medium A acting upon the collar 34 and shaft 25, but also to counteract any axially directed force which is exerted by a mechanical biasing arrangement, such as a spring or the thrust bearing 50 illustrated. Accordingly, in situations where the pressure differential between the mediums A and B is at a very low value, an axial force may be present which is insufficient to raise the pressure $P_S$ of the liquid metal ring to a value greater than $P_A$ and $P_B$. For example, if the pressure $P_A$ is equal to the pressure $P_B$, a seal will not be effected unless an axial force is applied to the shaft 25' which will tend to urge the collar 34' against the wall 21' of the housing. When such a force of suitably large magnitude is applied, the internal pressure $P_S$ of the liquid metal seal will be raised to the required value, which is greater than the pressure of each of the mediums A and B. Similarly, in situations where the pressure differential between the mediums separated by the seal is at a very low value or is even nonexistant and the shaft 25' is restrained in position against axial movement, the internal pressure of the liquid metal seal may be conveniently increased by an external fluid pressure supply source 52 as shown in FIG. 4 of the drawings. The external pressure supply source 52 may conveniently comprise a simple diaphragm arrangement which will act as a pressure reservoir to increase the pressure to the required level or may comprise a pressurized tank or "bottle" which will also act to raise the internal pressure of the liquid metal seal to a level which is greater than the pressure of either of the mediums A and B. Accordingly, the liquid metal seal of the invention may be utilized in applications wherein the mediums A and B are at the same pressure and also in applications wherein a pressure differential differential exists between these mediums. Similarly, the internal pressure of the liquid metal seal may be adjusted by either or both of the aforementioned mechanical biasing arrangement and external fluid pressure supply source to meet the internal pressure required by a particular operating condition.

The operation of the liquid metal seal of the invention may best be understood by reference to FIG. 5 of the drawings, wherein an enlarged fragmentary view of the housing and seal arrangement of FIGS. 1 and 2 of the drawings is employed to illustrate the situation existing at the liquid metal-medium A interface of the seal. Since the following discussion and analysis is applicable to both the liquid metal-medium A interface and the liquid metal-medium B interface, the term "medium N" will be employed to refer to both mediums. The liquid metal of the seal 40 is contained in the annular groove 37 of the housing because of the surface tension and non-wetting properties of the liquid metal with respect to the surfaces 35 and 36 of the seal. Since the surface of a liquid acts essentially in the same manner as a membrane under tension, the greater internal pressure $P_S$ of the liquid metal with respect to the pressure $P_N$ of medium N causes the surface of the liquid metal to be convex as shown in FIG. 5. Under conditions of equilibrium, the forces exerted on a circumferential increment $\Delta 1$ of the peripheral surface of the ring 40 may be expressed mathematically as

(11) $$P_S d\Delta 1 = 2T \cos \theta \Delta 1 + P_N d\Delta 1$$

where $P_S$ is the pressure of the liquid metal in pounds per square inch, $P_N$ is the pressure of medium N in pounds per square inch, $d$ is the gap between the faces of the seal in inches, T is the surface tension of the liquid metal in pounds per inch, and $\theta$ is the angle of contact between the liquid metal and the seal face 35. The surface tension T of the liquid metal is a property of the particular liquid metal employed and is a constant for a particular ambient temperature. The angle of contact $\theta$ which the liquid metal makes with the surface 35 expresses the wetting or non-wetting characteristic of the particular liquid metal employed with respect to the particular material employed for the surface 35 and depends upon the relationship between the cohesive force of the molecules of the liquid metal and the adhesive force between the molecules of the liquid metal and the molecules of the material of which the surface 35 is made. When the cohesive force is greater than the adhesive force, the liquid metal is said to be non-wetting with respect to the material of the surface 35. By cancelling $\Delta 1$ and rearranging Equation 11, the pressure differential $(P_S - P_N)$ existing at the liquid metal-medium N interface may be expressed as

(12) $$(P_S - P_N) = \frac{2T \cos \theta}{d}$$

Since the pressure differential $(P_S - P_N)$ is directly proportional to the cosine function of the angle of contact $\theta$, the maximum pressure differential for a particular gap setting $d$ will occur when $\theta$ reaches its minimum value. Accordingly,

(13) $$(P_S - P_N)_{max.} = \frac{2T \cos (\theta_{min.})}{d}$$

From an examination of Equation 13, it is believed apparent that for a particular liquid metal and for a particular material used for the face 35 of the seal, decreasing the gap setting $d$ of the seal will increase the pressure differential which the seal is able to withstand.

As previously mentioned, the action of the seal is somewhat similar to a conventional O ring seal in that the internal presure $P_S$ of the liquid metal forces it against the faces of the seal in a manner similar to the mannner in which the external force applied to a standard rubber O ring seal forces the O ring against the faces of the seal to create a fluid-tight sealing action. When the faces of the seal are rotated however, the liquid metal seal of the invention will exhibit a virtually frictionless operation, because the liquid metal will readily shear when a torque is applied to it. The slight frictional resistance presented by the liquid metal seal of the invention arises solely from the viscosity of the liquid metal employed. When medium N is medium B and medium B is a vacuum ($P_N = P_B = 0$), the expression for $P_S$ given in Equation 6 may be substituted for $P_S$ in Equation 13 with the result that

(14) $$(P_A)_{max.} = \left[1 - \left(\frac{r_i}{r_o}\right)^2\right] \frac{2T \cos (\theta_{min.})}{d}$$

As an example of a typical application wherein medium B is a vacuum and gallium is the liquid metal employed in the seal, the following representative values may be set forth:

$T = 4.2 \times 10^{-3}$ pounds per inch
$\theta$ max. $= 25°$ (typical for gallium with most surfaces)
$d = 0.0002$ inch.

When these values are substituted in Equation 14 it will be seen that $(P_A)$max., the maximum pressure the seal can withstand, is 29 p.s.i. or almost two atmospheres.

The liquid metal seal of the invention has been thus far described with respect to an application wherein the motion being transmitted through the seal is purely a rotary motion, as in the arrangement illustrated in FIGS. 1 through 5 of the drawings, for example. For this arrangement, the faces of the seal may each be coplanar and be parallel with respect to each other to permit transmission of the required rotary motion with an equidistant spacing of the faces. The liquid metal seal of the invention, however, will also function satisfactorily in applications wherein not only rotary motion but also translatory motion must be transmitted. In certain gyroscopes and other spatial orientation responsive devices of the type wherein the gyro rotor is mounted, a float which is pivotally mounted in a floatation fluid in one portion of the gyroscope housing and the pickoff for the gyroscope is located in another portion of the gyroscope housing which has been evacuated, the liquid metal seal of the invention will permit the transmission of both rotary motion and pivotal motion through an aperture in the housing wall separating the fluid-filled portion from the evacuated portion. For example, in FIG. 6 of the drawings there is shown a schematic diagram of a two-axis rate gyroscope of the type described in the copending patent application of Hugh E. Riordan, Ser. No. 423,148, filed Jan. 4, 1965, and assigned to the assignee of the present application. As seen in FIG. 6, the gyroscope comprises a substantially cylindrical housing 60 which is divided into interior portions 61 and 62 by a dividing wall 63. The rotor portion of the gyroscope is enclosed in a cylindrical float unit 64 which is disposed in portion 61 of the housing. The float 64 is mounted at one end thereof on an end wall 65 of the housing with a universal pivot arrangement 66, so that the float is capable of rotational movement and is also capable of limited pivotal movement about two mutually perpendicular axes which are also perpendicular to the X—X reference axis of the gyroscope. The foregoing rotational and pivotal motions of the float 64 are transmitted by means of an output shaft 67, which extends through an aperture 68 formed in the wall 63 of the housing, to a pickoff arrangement indicated schematically as 69. The pickoff 69 is disposed in the interior portion 62 of the housing. When the pickoff unit 69 is of the vibrating beam transducer type disclosed in the aforementioned copending patent application, the pickoff unit is preferably located in a vacuum to insure maximum performance. The pickoff unit functions essentially to restrain the rotation of the float 64 which is disposed in the portion 61 of the housing to provide a rate output signal. The portion 61 of the gyro housing in which the float is mounted is filled with a flotation fluid, such as oil, for example, to effectively isolate the sensitive elements of the gyroscope against transient accelerations and other forces which would impair the accuracy of operation of the gyro.

In effect, the fluid flotation of the rotor unit functions as an integrating device to average or smooth out transient fluctuations in the sensing action of the gyroscope. Accordingly, as the gyroscope is subjected to acceleration forces along the two axes which are mutually perpendicular to the X—X axis of the gyro housing, the float 64 will pivot to a small extent about the pivot point 66 and will be restrained or "damped" by the flotation fluid within the portion 61 of the housing. Since the portion 61 of the housing is filled with the flotation fluid and the portion 62 of the housing is evacuated to produce a vacuum environment for the pickoff 69, it is apparent that a motion-transmitting seal must be provided around the aperture 68 which is capable of transmitting both the rotary and pivotal movements of the shafts 67 of the gyro. To this end, the rotor float 64 is provided with a projection or "boss" 70 which has a spherical convex face. The internal wall 63 of the housing is provided with a circular disk or insert 71. As seen in FIGS. 7 and 8 of the drawings, the disk 71 has an opening 71A which is concentrically disposed about the aperture 68 of the wall to form a mating seal face with the spherical convex face of the boss 70. The surface of the disk 71 which faces the boss 70 is spherically concave and is provided with an annular groove 72 surrounding the opening 71A. The annular groove 72 is connected to a fill tube 73 which extends through the disk and the housing wall 63 to the exterior of the housing. When the fill tube is filled with a liquid metal, as previously described, a liquid metal ring 74 will be produced between the mating spherical faces of the members 70 and 71 and will extend completely around the opening 71A of the disk member 71.

The operation of this embodiment of the invention may best be understood by reference to FIGS. 7 and 8 of the drawings, wherein the mating seal parts are shown in an enlarged view. In FIG. 7 of the drawings, the longitudinal axis of the float 64 and shaft 67 is shown as being in alignment with the X—X reference axis of the gyro housing 69. In FIG. 8 of the drawings, the longitudinal axis of the float 64 and shaft 67 is shown as being pivoted about the pivot point 66, so that a small angle exists between this axis and the X—X reference axis of the housing. It may be noted from an inspection of FIGS. 7 and 8 of the drawings, that for all angular positions of the shaft and float axis with respect to the housing reference axis, the gap between the spherical surface of the boss 70 and the spherical surface of the disk 71 remains constant. This result is obtained by making the spherical face of the boss 70 convex and the spherical face of the disk 71 concave with the center of curvature of both faces coincident with the pivot point 66. Accordingly, the rotary motion of the output shaft 67 of the gyro float 64 may be transmitted through the aperture 68 of the housing at any angular position of the float axis with respect to the housing reference axis without impairing the virtually frictionless operation of the liquid metal seal of the invention. Since the liquid metal in the seal must be non-wetting with respect to the materials employed for the boss 70 and the disk 71 of the seal, the pivotal sliding motion of the boss with respect to the ring 74 will not in any way impair the satisfactory fluid-tight operation of the seal. Although the disk 71 is shown as a separate member to provide the spherical concave seal face, it is obvious that the seal face could be formed integral with the surface of wall 63, if desired. Accordingly, it is believed apparent that the face type liquid metal seal of the invention may be utilized in numerous devices having varied motion transmission requirements by suitably altering the shape of the seal faces.

The invention disclosed herein also contemplates a novel method of making the face type liquid metal seal. The method may best be described by reference to FIGS. 9, 10 and 11 of the drawings which illustrate the fill tube and faces of the seal during various stages in the construction of the seal. For purposes of explanation, the seal arrangement shown in FIGS. 9, 10 and 11 is that illustrated in FIGS. 1 and 2 of the drawings, wherein the seal faces are each coplanar although it is believed apparent that the same method could be employed equally well with any configuration of the faces of the seal. In the absence of an axially directed biasing force, when the seal is first assembled, the seal faces 35 and 36 are butted together by a holding force $F_H$ as shown in FIG. 9 of the drawings, and the fill tube 38 is connected to a suitable vacuum pump, not shown, to completely evacuate the annular groove 37 and the fill tube. By evacuating the annular groove and fill tube, all air and other foreign matter which might contaminate the liquid metal are completely removed and the liquid metal is enabled to completely fill the groove and tube. The next step is to completely fill the annular groove 37 and the fill tube 38 with the particular liquid metal to be employed in the seal while still maintaining the vacuum. FIG. 10 of the drawings shows the annular groove 37 and the fill tube 38 completely filled with the selected liquid metal. The top 39 of the fill tube is then crimped closed to maintain the liquid metal within the tube and groove. It will be noted that at this time the face 35 of the collar 34 is still directly butted against the face 36 of the interior housing wall 21, since the internal pressure of the liquid metal within the fill tube is not great enough to force the two faces apart. The next step in assembling the liquid metal seal of the invention is shown in FIG. 11 of the drawings wherein the fill tube is flattened to a predetermined length L to force the faces 35 and 36 of the seal apart and thereby establish the required gap setting $d$, as illustrated.

The precise length L of the fill tube which must be flattened to establish a particular gap setting $d$ of the seal may easily be calculated in accordance with established hydraulic principles by determining the cross-sectional areas of the seal and fill tube. When the fill tube has been flattened, the holding force $F_H$ may be removed from the collar 34 and the areas to be separated by the seal may be filled with their respective fluid mediums or evacuated as the case may be. Since the correct setting of the gap $d$ of the seal is established merely by flattening a predetermined length L of the fill tube 38, it is apparent that this method of making the seal readily lends itself to performance by relatively unskilled labor and is especially suited for automated processes. The foregoing discussion of the method of making the seal demonstrates that the liquid metal seal of the invention eliminates many hand assembly operations which would be required with many of the prior art seals, such as the aforementioned O ring, bellows and diaphragm seals, for example, since the assembly operations which require the placing of the O rings, bellows or diaphragms between the faces of the seal are completely eliminated. It may also be noted that the liquid metal seal of the invention may be completely constructed after the assembly of the device in which the seal is to be utilized, whereas the prior art seals must be installed and tested before complete assembly of the device. Accordingly, the liquid metal seal of the invention readily lends itself to many applications wherein the cost and difficulty of installing the aforementioned prior art seals would be prohibitively high.

It is believed apparent that many changes could be made in the construction and described uses of the foregoing face type liquid metal seal and many seemingly different embodiments of the invention could be constructed without departing from the scope thereof. Accordingly, it is intended that all matter contained in the above description or shown in the accompanying drawings shall be interpreted as illustrative and not in a limiting sense.

What is claimed is:

1. A face type liquid metal seal for apparatus of the type wherein the rotation of a shaft is transmitted through an aperture in a wall separating two fluid mediums and the shaft is provided with a face member rotatable therewith to form with the surface of the wall surrounding the aperture a pair of equidistantly spaced seal faces, said seal comprising an annular groove formed in the seal face surrounding the aperture and concentrically disposed with respect to the axis of rotation of the shaft; and a ring of liquid metal filling said groove and separating the seal faces to permit rotational movement of the shaft, the liquid metal forming said ring being non-reacting and non-wetting with respect to the two fluid mediums and the materials of which the seal faces are made, means providing an internal pressure greater than the pressure of each of the two fluid mediums, and wherein a fill tube is disposed in the wall separating the fluid mediums in communication with said annular groove to provide means for filling the annular groove with the liquid metal, whereby said liquid metal ring provides a fluid-tight seal separating the two fluid mediums and presents a minimal frictional resistance to rotation of the shaft.

2. A face type liquid metal seal as claimed in claim 1, wherein each of the seal faces is coplanar and the faces are parallel with respect to each other.

3. A face type liquid metal seal as claimed in claim 1, wherein each of the seal faces is spherical and the faces are concentrically disposed with respect to each other, so that a pivotal movement of the shaft about a point along the shaft length coincident with the center of curvature of the seal faces will not destroy the equidistant spacing of the faces.

4. A face type liquid metal seal as claimed in claim 1, wherein the shaft is axially unrestrained and the pressure of one of the fluid mediums is greater than the pressure of the other of the fluid mediums, so that the resulting pressure differential between the mediums produces an axial force tending to move the seal faces together, to thereby increase the internal pressure of the liquid metal ring.

5. A face type liquid metal seal as claimed in claim 1, wherein mechanical biasing means are provided to exert a force on the shaft in a direction tending to move the seal faces together, to thereby increase the internal pressure of the liquid metal ring.

6. A face type liquid metal seal as claimed in claim 1, wherein the shaft is axially restrained and an external fluid pressure supply source is connected to said fill tube to increase the internal pressure of the liquid metal ring.

7. A face type liquid metal seal as claimed in claim 1, wherein the liquid metal is mercury.

8. A face type liquid metal seal as claimed in claim 1, wherein the liquid metal is a mercury alloy.

9. A face type liquid metal seal as claimed in claim 1, wherein the liquid metal is gallium.

10. A face type liquid metal seal as claimed in claim 1, wherein the liquid metal is a gallium aloy.

11. In a spatial orientation responsive device of the type having a fluid-tight housing divided by a wall into a liquid-filled portion and a vacuum portion in which are respectively disposed rotor float means having a rotatable output shaft and pickoff means, and wherein the rotor means is pivotally mounted at one end thereof and is connected by the output shaft at the other end thereof to the pickoff means through an aperture in the housing wall, so that the rotor float shaft is adapted to transmit both rotational and pivotal motion through the aperture, the combination comprising first face means mounted on the rotor float output shaft for movement therewith in the liquid-filled portion of the housing adjacent the aperture, said face means having a spherical seal face with the center of curvature of the face coincident with the pivotal point of the rotor float means; second face means formed on the housing wall around the aperture and having a spherical seal face with the center of curvature of the face coincident with the pivot point of the rotor float means, so that the spherical faces of the first and second face means are equidistantly spaced for all pivotal positions of the rotor float output shaft; an annular groove formed in the spherical seal face of the second face means surrounding the aperture; and a ring of liquid metal filling said groove and separating the spherical seal faces to permit rotational and pivotal motion of the rotor float output shaft through the aperture, the liquid metal forming said ring being non-reacting and non-wetting with respect to the housing liquid and the materials of which the spherical seal faces are made and having an internal pressure greater than the pressure of the liquid-filled housing portion containing the float means, whereby the liquid metal ring provides a fluid-tight seal separating the two housing portions and presents a minimal frictional resistance to rotation of the rotor float output shaft.

12. The combination claimed in claim 11, further comprising a fill tube disposed in the housing wall in communication with said annular groove and the exterior of the housing to provide means for filling the annular groove with the liquid metal.

13. The method of making a face type liquid metal seal having first face means with an aperture formed therein in communication with two fluid mediums, an annular groove formed around the aperture in communication with a fill tube projecting exteriorly of the face means, and second face means mounted on a shaft for rotation therewith through the aperture, the first and second face means being adapted to provide a pair of mating equidistantly spaced seal faces upon axial displacement of the shaft, said method comprising the steps of applying a holding force to the shaft to force the seal faces together; evacuating the fill tube and annular groove to remove all air and other matter therefrom; filling the evacuated tube and groove with a liquid metal which is non-reacting and non-wetting with respect to the two fluid mediums and the materials of which the seal faces are made; crimping the end of the fill tube closed; and flattening a predetermined length of the tube to force the seal faces apart and establish a desired gap therebetween, so that the internal pressure of the liquid metal forming the seal is greater than the pressure of each of said mediums.

References Cited

UNITED STATES PATENTS

| | | | |
|---|---|---|---|
| 1,070,087 | 8/1913 | Van Deventer | 277—74 X |
| 2,075,148 | 3/1937 | Svenson | 277—74 X |
| 2,300,385 | 10/1942 | Kollberg et al. | 277—17 X |
| 3,038,731 | 6/1962 | Milleron | 277—135 X |

SAMUEL ROTHBERG, Primary Examiner

U.S. Cl. X.R.

29—400; 277—74, 96, 100, 135